United States Patent [19]

Sugiura

[11] Patent Number: 5,394,165
[45] Date of Patent: Feb. 28, 1995

[54] INDICATION DEVICE

[75] Inventor: Masami Sugiura, Tokyo, Japan

[73] Assignee: NEC Corporation, Japan

[21] Appl. No.: 27,256

[22] Filed: Mar. 5, 1993

[30] Foreign Application Priority Data

Mar. 13, 1992 [JP] Japan .................. 4-055768

[51] Int. Cl.$^6$ .............................................. G09G 3/32
[52] U.S. Cl. ............................... 345/82; 345/204; 345/903
[58] Field of Search ............ 345/56, 34, 82, 83, 345/127, 55, 1, 2, 98, 204, 205, 903

[56] References Cited

U.S. PATENT DOCUMENTS

| 4,357,671 | 11/1982 | Miller | 345/56 |
|---|---|---|---|
| 4,511,894 | 4/1985 | Johnston | 345/34 |
| 4,771,278 | 9/1988 | Pooley | 345/147 |
| 4,782,336 | 11/1988 | Bailey | 345/55 |
| 4,800,376 | 1/1989 | Suga et al. | 345/127 |
| 4,833,542 | 5/1989 | Hara et al. | 345/75 |
| 4,887,074 | 12/1989 | Simon et al. | 345/82 |

Primary Examiner—Alvin E. Oberley
Assistant Examiner—Steven J. Saras
Attorney, Agent, or Firm—Laff, Whitesel, Conte & Saret, Ltd.

[57] ABSTRACT

In an indication device comprising a plurality of indicators of the present invention, each indicator has an indicator control section inputting each signal except for data signals, and a logic section inputting data signals. The logic section receives an output of a logic section in an adjacent indicator, adds and/or subtracts a pre-determined number to and/or from a received signal, then outputs a result to a logic section in another indicator. More, the logic section outputs a signal corresponding to a location of the indicator to an indicator control section.

5 Claims, 3 Drawing Sheets

INDICATION DEVICE

BACKGROUND OF THE INVENTION

The present invention relates to an indication device, and more particularly to an indication device that verifies a location of a specified indicator when a plurality of indicator are adjacently installed.

As a conventional indication device, there are roughly two types of indication device as below for adjacently installing a plurality of indicator and making each of them indicate differently each other:

(1) An indication device having a respective exclusive signal line for each indicator;
(2) An indication device comprising a bus line with data lines of the same number of indicators and necessary signal lines to connect each indicator to the bus line. A data line to be selected is selected by a selector and dip switches in each indicator.

However, in such a conventional indication device described as above, when using the above indication device (1), there is a problem that the exclusive lines as many as the indicators adjacently installed are needed, and wiring of the exclusive lines becomes to be very complicated as the number of the indicators increasing. And when using the above indication device (2), there is a problem that the dip switch with each indicator must be set for each pre-determined status, so that the resetting takes very much time for moving or changing each indicator at maintenance and repair work.

SUMMARY OF THE INVENTION

This invention takes such a matter into consideration, and aims to offer an indication device that prevents wiring of the exclusive signal lines to be complicated and save labor for setting many dip switches and the like, when adjacently installing a plurality of indicators and making each of them indicate differently each other.

The object of the present invention is achieved by an indication device comprising: a plurality of indicators having a logic section operating an inputted digital signal and an output of operation result from said logic section of one of said plurality of indicators being supplied to said logic section of another one of said plurality of indicators.

Moreover, the indication device by the present invention can be comprised by an input section inputting a digital signal, a logic section operating to add and/or subtract a pre-determined number to and/or from an digital signal supplied from the input section, an output section outputting an operation result.

Further, the logic section can be comprised to output data after operating a pre-determined number to an digital signal by switching a switch in said data selector ON/OFF, more particularly after adding one to a digital signal or after subtracting one from a digital signal.

Described as above, the indication device by the present invention has the same function as a dip switch in a conventional indication device, as it has a function to receive the digital data and to output the data after adding or subtracting a pre-determined number. Therefore, when adjacently installing a plurality of indicators and making each of them indicate differently each other, it enables to save labor for setting many dip switches and the like as in the conventional indication device, and to prevent wiring of the exclusive signal lines to be complicated.

DETAILED DESCRIPTION OF PREFERRED EMBODIMENTS

Figure 1:
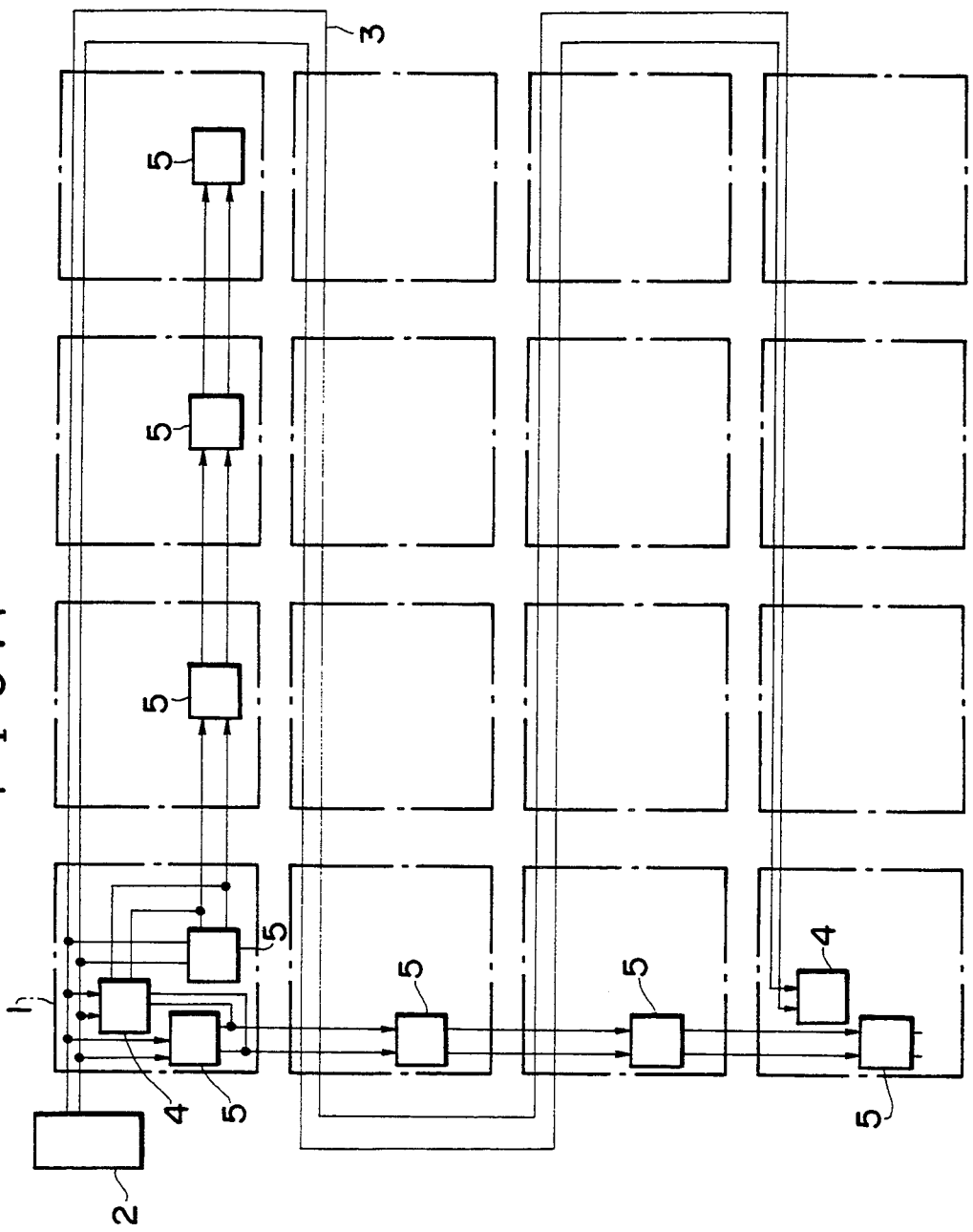
FIG. 1 illustrates a block diagram showing an indication device by an embodiment of the present invention.

FIG. 1 is a block diagram showing an indication device of an embodiment by the present invention. In FIG. 1 the sixteen (4×4=16) indicators 1 are installed. The signal generator 2 is respectively connected to the indicator control sections 4 and the logic sections 5 in the sixteen indicators 1 through the bus line 3. The logic section 5 in each indicator 1 is connected in series to the logic section 5 in another indication device 1 as shown in FIG. 1. Hereupon, an input section receiving a digital signal and an output section outputting a result of operation are not shown in the figure.

Figure 2:
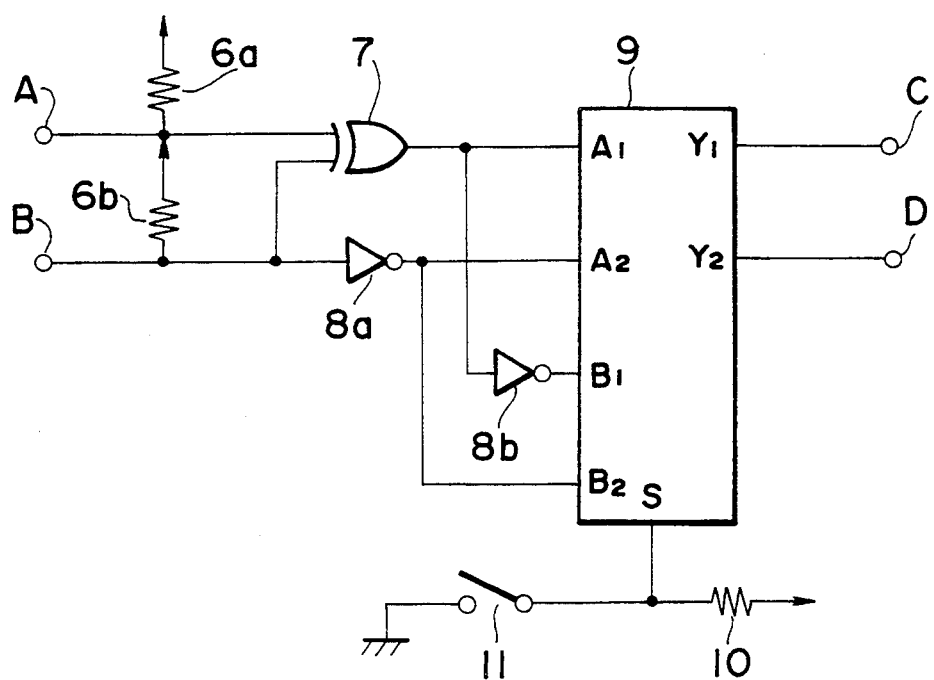
FIG. 2 illustrates a circuit diagram showing an embodiment of a logic section operating with two bits.

FIG. 2 is a circuit diagram showing an embodiment of the logic sections 5 operating with two bits in the indicators 1 as shown in FIG. 1. As shown in FIG. 2 the input terminal A is connected to the pull-up resistor 6a and one input terminal of the exclusive OR gate 7, the input terminal B is connected to the pull-up resistor 6b and another input terminal of the exclusive OR gate 7 and the input terminal of the inverter gate 8a. The output terminal of the exclusive OR gate 7 is connected to the input terminal B1 through the input terminal A1 of the data selector IC9 and the inverter gate 8b. The output terminal of the inverter gate 8a is connected to the input terminals A2 and B2 of the data selector IC9. The output terminal Y1 of the data selector IC9 is connected to the output terminal C, the output terminal Y2 of the data selector IC9 is connected to the output terminal D, and the select terminal S of the data selector IC9 is connected to the protection resistor 10 and the switch 11.

Next, the operation of the indication device by this embodiment comprised as above is explained. The pull-up resistors 6a and 6b shown in FIG. 2 are pull-up resistors to fix the input terminal of the exclusive OR gate 7 at high level when the input terminals A and B are in an open status, and the value of this resistor is 5.1 k Ω in this embodiment. The exclusive OR gate 7 outputs in a low level when two input terminal levels are coincided or outputs in a high level when they are not coincided. As for the data selector IC9, that is the logic IC74LS157 for example, the data charged at the input terminals A1 and A2 are respectively outputted to the output terminals Y1 and Y2 when the switch 11 is ON, the data charged at the input terminals B1 and B2 are respectively outputted to the output terminals Y1 and Y2 when the switch 11 is OFF. The protection resistor 10 is a resistor for protection to fix the select terminal S to a pre-determined level when the switch 11 is OFF.

Described as above, the relationship between the data supplied from the input terminals A and B in the logic section 5, and the data outputted to the output terminals C and D shown in FIG. 2 is described as a truth table given in the following Table 1.

TABLE 1

| A | B | C | D | C | D |
|---|---|---|---|---|---|
| 1 | 1 | 0 | 0 | 1 | 0 |
| 0 | 0 | 0 | 1 | 1 | 1 |
| 0 | 1 | 1 | 0 | 0 | 0 |
| 1 | 0 | 1 | 1 | 0 | 1 |
| | | Switch ON | | Switch OFF | |

Now, letting A and C to be upper bit, B and D to be lower bit, and converting them into decimal number and looking at the above Table 1, it is found that 1, 2, 3, and 0 are respectively outputted corresponding to inputting 0, 1, 2, and 3 when the switch 12 is ON, and on the other hand 3, 0, 1, and 2 are respectively outputted corresponding to inputting 0, 1, 2, and 3 when the switch 11 is OFF. Namely the logic section 5 receive two bit data from the two input terminals and output the data after adding one or subtracting one by turning ON or OFF the switch 11.

In each indicator 1 in FIG. 1, the indicator control section 4 receives each signal through the bus line 3 except for a data signal, and the logic section 5 in each indicator 1 receives the data signal through the bus line 3. Supposing the upper end row is the first row and the left end column is the first column, the output of the logic section 5 in each indicator 1 becomes to be 0, 1, 2, and 3 in sequence from the logic section 5 in the indicator 1 in the first row, and to be 0, 1, 2, and 3 in sequence from the logic section 5 in the indicator 1 in the first column. These outputs of the logic sections 5 are supplied to the indicator control section 4 in each indicator 1, so that it makes possible to send the data corresponding to the location where the indicator 1 is installed to the indicator control section 4.

Figure 3:
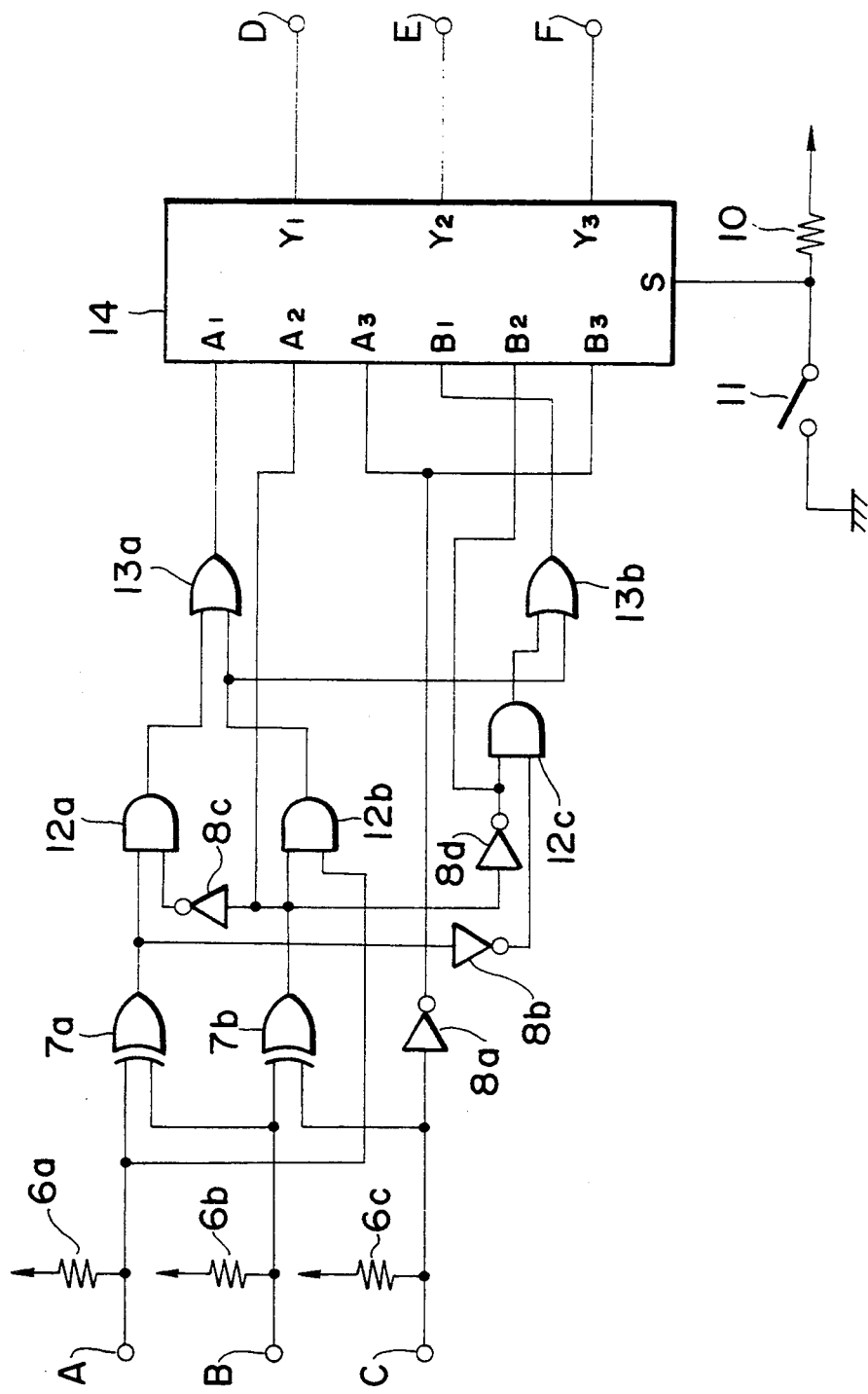
FIG. 3 illustrates a circuit diagram showing an embodiment of a logic section operating with three bits.

Next, another embodiment of the present invention is described. FIG. 3 is a circuit diagram showing an embodiment of the logic section 5 operating with three bits in the indicator 1 shown in FIG. 1. The logic section 5 shown in FIG. 3 comprises the pull-up resistors 6a, 6b, and 6c, the exclusive OR gates 7a and 7b, the inverter gates 8a, 8b, 8c, and 8d, the protection resistor 10, the switch 11, the and gates 12a, 12b, and 12c, the OR gates 13a, and 13b, the data selector IC14, the input terminals A, B, and C and the output terminals D, E, and F.

The relationship between the data supplied from the input terminals A, B, and C and outputted to the output terminals D, E, and F in the logic section 5 shown in FIG. 3 is described as a truth table given in the following Table 2.

TABLE 2

| A | B | C | D | E | F | D | E | F |
|---|---|---|---|---|---|---|---|---|
| 1 | 1 | 1 | 0 | 0 | 0 | 1 | 1 | 0 |
| 0 | 0 | 0 | 0 | 0 | 1 | 1 | 1 | 1 |
| 0 | 0 | 1 | 0 | 1 | 0 | 0 | 0 | 0 |
| 0 | 1 | 0 | 0 | 1 | 1 | 0 | 0 | 1 |
| 0 | 1 | 1 | 1 | 0 | 0 | 0 | 1 | 0 |
| 1 | 0 | 0 | 1 | 0 | 1 | 0 | 1 | 1 |
| 1 | 0 | 1 | 1 | 1 | 0 | 1 | 0 | 0 |
| 1 | 1 | 0 | 1 | 1 | 1 | 1 | 0 | 1 |
| | | | Switch ON | | | Switch ON | | |

Therefore the logic section 5 shown in FIG. 3 has the same function as the logic section 5 shown in the above FIG. 2, and it is possible to connect the indicators 1 up to 64 units ((two cubed)×(two cubed)=64).

What is claimed is:

1. An indication device comprising:
   a plurality of indicators;
   a control section in each of said indicators for controlling an indication;
   a logic section in each of said indicators; and
   a gate circuit and data selector in each of said logic section; wherein
   said logic section adds a preset number to a digital signal input therein and outputs a resulting signal to said control section and to an adjacent logic section when a switch of said data selector is turned on, and
   said logic section subtracts a present number from a digital signal input therein and outputs a resulting signal to said control section and to an adjacent logic section when a switch of said data selector is turned off.

2. The indication device of claim 1, wherein said logic section adds 1 to said digital signal and outputs a resulting signal when a switch of said data selector is turned on.

3. The indication device of claim 1, wherein said logic section subtracts 1 from said digital signal and outputs a resulting signal when a switch of said data selector is turned off.

4. An indication device comprising:
   a plurality of indicators;
   a control section for each of said indicators for controlling an indication; and
   a logic section for each of said indicators;
   wherein said logic section comprises:
   a first input terminal for receiving a digital signal;
   a second input terminal for receiving a digital signal;
   a first pull-up resistor having one end connected to said first input terminal;
   a second pull-up resistor having one end connected to said second input terminal;
   an exclusive OR gate circuit having one input connected to said first input terminal and another input connected to said second input terminal;
   a first inverter gate circuit having an input connected to said second input terminal;
   a second inverter gate circuit having an input connected to an output of said exclusive OR gate circuit;
   a data selector circuit connected to said outputs of said exclusive OR gate circuit, said first inverter gate circuit, and said data selector circuit;
   a switch connected to said data selector circuit;
   a protective resistor connected to said data selector circuit; wherein:
   said logic section adds 1 to said digital signal input therein and outputs a resulting signal to said control section and to a logic section of an adjacent indicator when said switch is on, and
   said logic section subtracts 1 from said digital signal input therein and outputs a resulting signal to said control section and to a logic section of an adjacent indicator when said switch is off.

5. An indicator device comprising:
   a plurality of indicators;
   a control section for each of said indicators for controlling an indication; and
   a logic section for each of said indicators;
   wherein said logic section comprises:
   a first input terminal for receiving a digital signal;
   a second input terminal for receiving a digital signal;
   a third input terminal for receiving a digital signal;

a first pull-up resistor having one end connected to said first input terminal;

a second pull-up resistor having one end connected to said second input terminal;

a third pull-up resistor having one end connected to said third input terminal;

a first exclusive OR gate circuit having one input connected to said first input terminal and another input connected to said second input terminal;

a second exclusive OR gate circuit having one input connected to said second input terminal and another input connected to said third input terminal;

a first inverter gate circuit having one input connected to said third input terminal;

a second inverter gate circuit having one input connected to an output of said first exclusive OR gate circuit;

a third inverter gate circuit having one input connected to an output of said second exclusive OR gate circuit;

a fourth inverter gate circuit having one input connected to said second exclusive OR gate circuit;

a first AND gate circuit having one input connected to an output of said first exclusive OR gate circuit and another input connected to an output of said third inverter gate circuit;

a second AND gate circuit having one input connected to an output of said second exclusive OR gate circuit and another input connected to said first input terminal;

a third AND gate circuit having one input connected to said fourth inverter gate circuit and another input connected to said second inverter gate circuit;

a first OR gate circuit having one input connected to an output of said first AND gate circuit and another input connected to an output of said second AND gate circuit;

a second OR gate circuit having one input connected to an output of said third AND gate circuit and another input connected to an output of said second AND gate circuit;

a data selector circuit connected to outputs of said first OR gate circuit, said second exclusive OR gate circuit, said first inverter gate circuit, said second OR gate circuit, and said fourth inverter gate circuit;

a switch connected to said data selector circuit; and a protective resistor connected to said data selector circuit; wherein said logic section adds 1 to said digital signal input therein and outputs a resulting signal to said control section and to a logic section of an adjacent indicator when said switch is on, and said logic section subtracts 1 from said digital signal input therein and outputs a resulting signal to said control section and to a logic section of an adjacent indicator when said switch is off.

* * * * *